(12) United States Patent
Neice

(10) Patent No.: US 11,511,823 B2
(45) Date of Patent: Nov. 29, 2022

(54) SCOOTER CONVERSION KIT AND METHOD

(71) Applicant: Michael Neice, Shelbyville, IN (US)

(72) Inventor: Michael Neice, Shelbyville, IN (US)

( * ) Notice: Subject to any disclaimer, the term of this patent is extended or adjusted under 35 U.S.C. 154(b) by 81 days.

(21) Appl. No.: 17/215,490

(22) Filed: Mar. 29, 2021

(65) Prior Publication Data

US 2021/0300500 A1    Sep. 30, 2021

Related U.S. Application Data

(60) Provisional application No. 63/002,432, filed on Mar. 31, 2020.

(51) Int. Cl.
*B62K 17/00* (2006.01)
*B62K 5/007* (2013.01)

(52) U.S. Cl.
CPC .............. *B62K 17/00* (2013.01); *B62K 5/007* (2013.01); *B62K 2202/00* (2013.01)

(58) Field of Classification Search
CPC .... B62K 17/00; B62K 5/007; B62K 2202/00; B62K 5/003; B62J 17/06
See application file for complete search history.

(56) References Cited

U.S. PATENT DOCUMENTS

| | | | | |
|---|---|---|---|---|
| 5,020,624 A * | 6/1991 | Nesterick | ............... | B62K 5/025 280/282 |
| 6,089,586 A * | 7/2000 | Rudell | ..................... | B62K 9/02 280/282 |
| 6,325,441 B1 * | 12/2001 | Ugolini | ..................... | B62J 17/08 296/108 |
| 6,942,053 B2 * | 9/2005 | Hinton | .................. | B62D 61/12 180/209 |
| 9,545,969 B2 * | 1/2017 | Byrne | ....................... | B62K 9/02 |
| 9,796,443 B2 * | 10/2017 | Eckert | ...................... | B62K 9/00 |
| 10,040,501 B2 * | 8/2018 | Haines | ..................... | B62J 17/08 |
| 2007/0182116 A1 * | 8/2007 | Davey | ...................... | B62K 3/16 280/87.05 |

(Continued)

FOREIGN PATENT DOCUMENTS

FR    3036366 A3 * 11/2016    ................ B62J 7/02

OTHER PUBLICATIONS

Electric Wheelchairs USA, Vintage Vehicles USA Gatzby X 4 Bariatric Scooter 500 lbs, Date Accessed: Jun. 28, 2021, https://www.electricwheelchairsusa.com/products.

*Primary Examiner* — Darlene P Condra
(74) *Attorney, Agent, or Firm* — Overhauser Law Offices, LLC

(57) ABSTRACT

A mobility scooter conversion kit and method that utilizes a standard mobility scooter as its base frame to make the scooter resemble any motor vehicle. The main frame of the scooter is only altered by adding an extension member with a bracket, replacing a first bolt on the seat frame with a long bolt, and reversing the orientation of a second bolt on the opposite side of the seat frame. The first body member that resembles the front of a motor vehicle has a recess that sits on the steering column of the scooter and is secured into place with a latching mechanism. The second body member that resembles the rear end of a motor vehicle is hooked on to the bracket of the extension member and secured into place using the long bolt and a bolt attachment connecting to the reversed bolt.

2 Claims, 5 Drawing Sheets

(56) References Cited

U.S. PATENT DOCUMENTS

| | | | | |
|---|---|---|---|---|
| 2013/0134762 A1* | 5/2013 | Hsiao | ............... | B60N 2/01583 |
| | | | | 297/440.1 |
| 2016/0052582 A1* | 2/2016 | Louisa | ............... | B60R 21/13 |
| | | | | 296/190.03 |
| 2016/0318539 A1* | 11/2016 | Joos | ............... | B62J 9/20 |

* cited by examiner

SCOOTER CONVERSION KIT AND METHOD

CROSS REFERENCE TO RELATED APPLICATIONS

This application claims the benefit of U.S. Provisional Application No. 63/002,432 filed Mar. 31, 2020.

FIELD OF THE INVENTION

The present invention relates to conversion kits, and particularly, to conversion kits for scooters and method of their use.

BACKGROUND

This invention relates to mobility scooters. Mobility scooters are typically used by those with problems walking or standing for long periods of time. The main purpose of a mobility scooter is to increase the independence of people with mobility restrictions. Mobility scooters are often used to traverse pavement, grass, or to move through a grocery store. Those with decreased mobility can operate a mobility scooter on their own, similarly to how they would drive a car.

Although there is at least one mobility scooter with a front portion modeled after a vintage vehicle known in the related art, The Gatsby Vintage Mobility Scooter, the components of the scooter that make the Gatsby Scooter look like a vintage vehicle are not removable and interchangeable. See (https://www.topmobility.com/gatsby-vintage-mobility-scooter.htm).

SUMMARY OF THE INVENTION

The present invention is a kit that permits the conversion of a standard mobility scooter into a mobility scooter that resembles a motor vehicle. The kit comprises a horizontal extension member adjacent the back of a seat of a standard mobility scooter. The extension member is attached to the back of the frame of the scooter and may be even with the seat. The extension member comprises a bracket member that can receive a plurality of hook members.

The kit further comprises a first body member that resembles the front end of a motor vehicle. The first body member has a recess to fit around a steering column of a standard mobility scooter. The first body member further has a latching member used to secure the first body member around the steering column.

The scooter's frame has a first side member connected to the seat and a second side member also connected to the seat. The original bolt on the first side member connected to the seat is replaced with a long bolt. The original bolt on the second side member connected to the seat is removed and replaced with the nut on the opposite side of the second side member, a reversed bolt.

The kit has a second body member that resembles the back end of a motor vehicle. The second body member has a first and a second hook member that fit into the bracket on the extension member. Further, the second body member has a first and second side panel. The first side panel has a first hole and the second side panel has a second hole that each line up with the long bolt and the reversed bolt, respectively. There is a bolt attachment that fits through the second hole of the second side panel that is attachable to the reversed bolt.

To accomplish the conversion, the extension member with the bracket member is first secured to the frame of the scooter even with the back of the seat bottom. The original bolt on the first side member connected to the seat is replaced with a long bolt. The original bolt on the second side member connected to the seat is removed and replaced with the nut on the opposite side of the second side member, a reversed bolt.

The first body member is situated with the recession fitting around the steering column. The latching member is placed around the steering column to secure the first body member in place.

The second body member is situated on the bracket on the extension member utilizing the first and second hook members. The first hole on the first side panel is placed over the long bolt. The second hole on the second side panel is situated so it lines up with the reversed bolt. The bolt attachment is inserted through the second hole on the second side panel and attached to the reversed bolt. The first side panel is secured by placing a first nut over the longer bolt, holding the first side panel between the first nut and the first side member connected to the seat. The second side panel is held in place by securing the bolt attachment to the reversed bolt.

DETAILED DESCRIPTION

Figure 1:
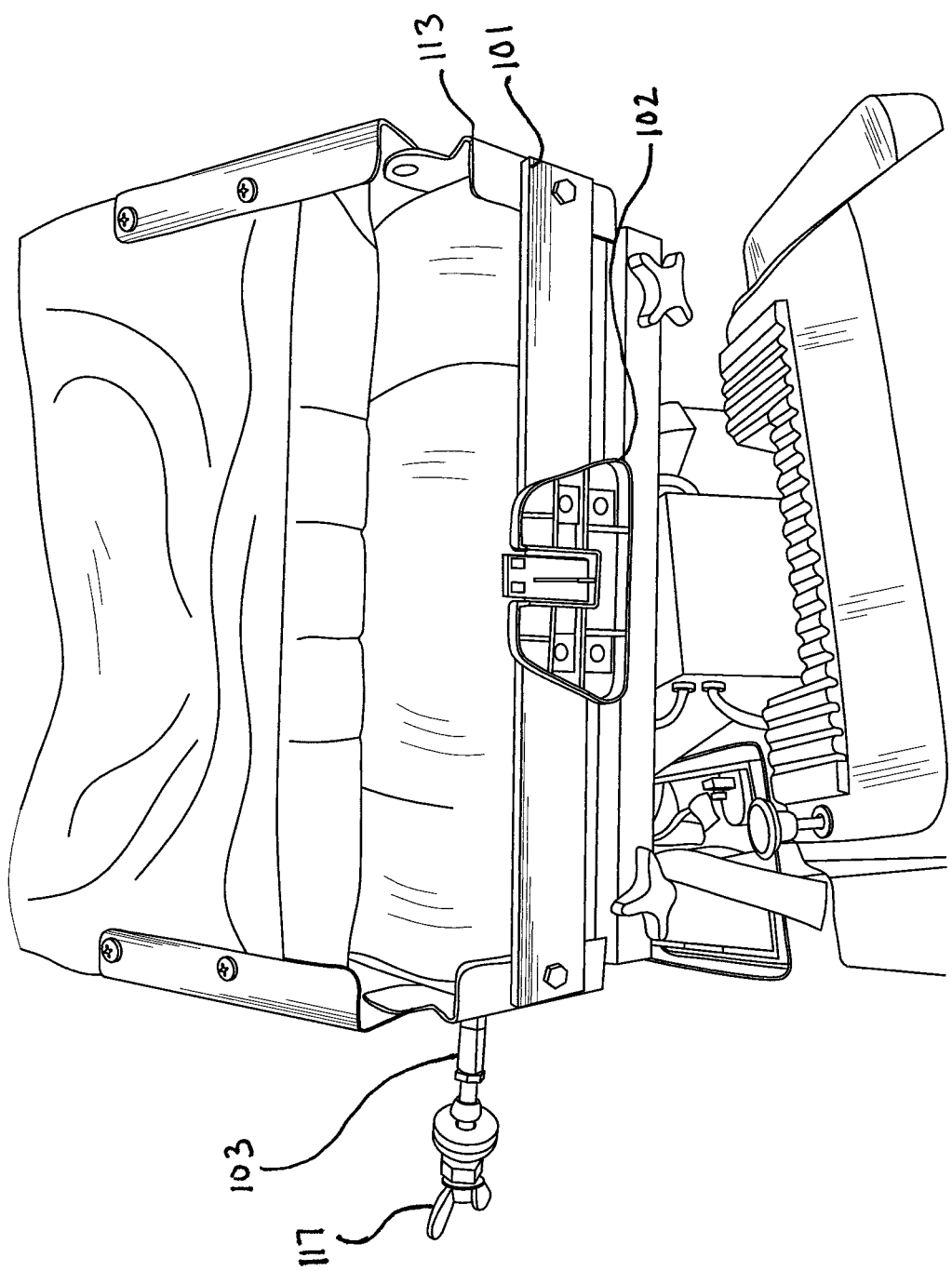
FIG. 1 shows a close-up view of the long bolt on the left-hand side of the frame and the extension member with the bracket secured to the frame of the scooter at the back of the seat.

A standard mobility scooter as shown in FIG. 1 is first fit with an extension member 101 on the back of the frame even with the bottom of the seat. A bracket 102 is attached to the extension member 101 to receive a plurality of hooks. A long bolt 103 replaces the original bolt on the frame of the seat 113 on the left-hand side (all right/left directions are described as looking from the rear of the scooter towards the front) as shown in FIG. 1.

Figure 2:
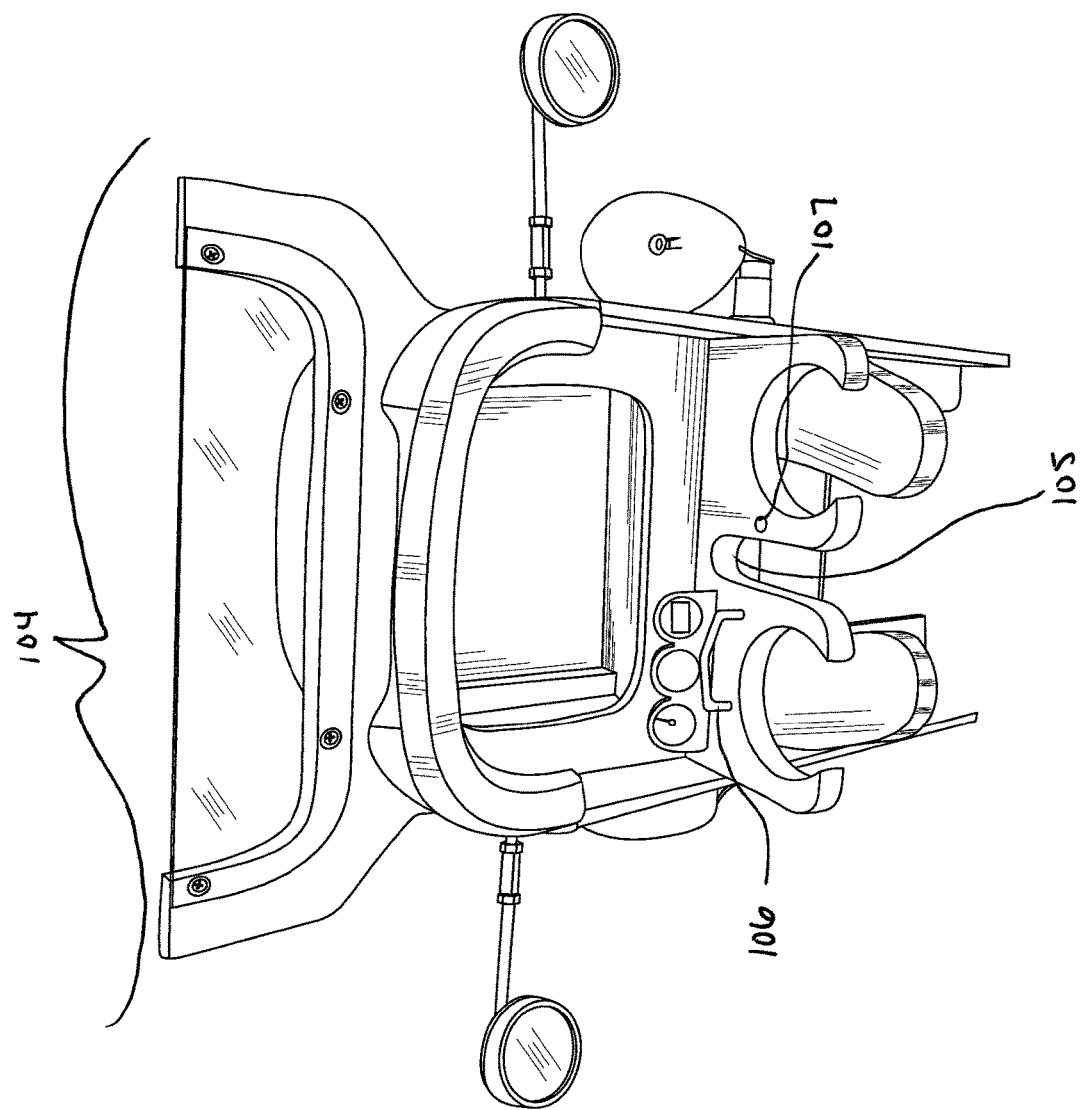
FIG. 2 shows the backside of the first member body that contains a recession to fit around the steering column and a latching member to secure the first body member to the steering column (not pictured).
Figure 5:
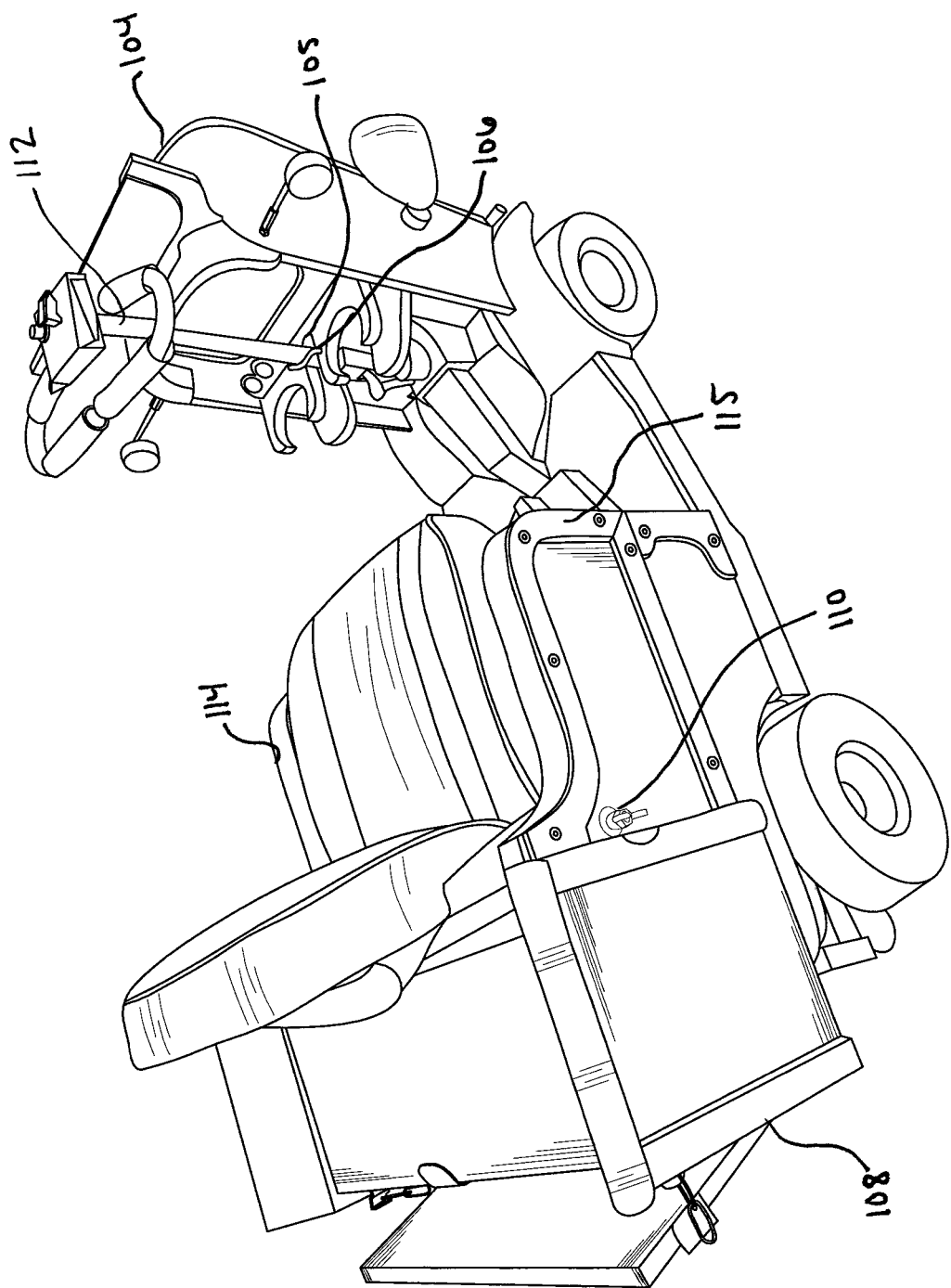
FIG. 5 shows a perspective view of the mobility scooter with both the first and second body members attached.

As shown in FIGS. 2 and 5, the first member body 104 resembles the front end of a motor vehicle and is attachable to the standard mobility scooter. FIG. 2 shows the recession 105 in the first member body 104 that fits over the steering column 112 (FIG. 5) and the latching member 106 that fits into the hole 107 secures the first member body 104 to the steering column 112.

Figure 3:
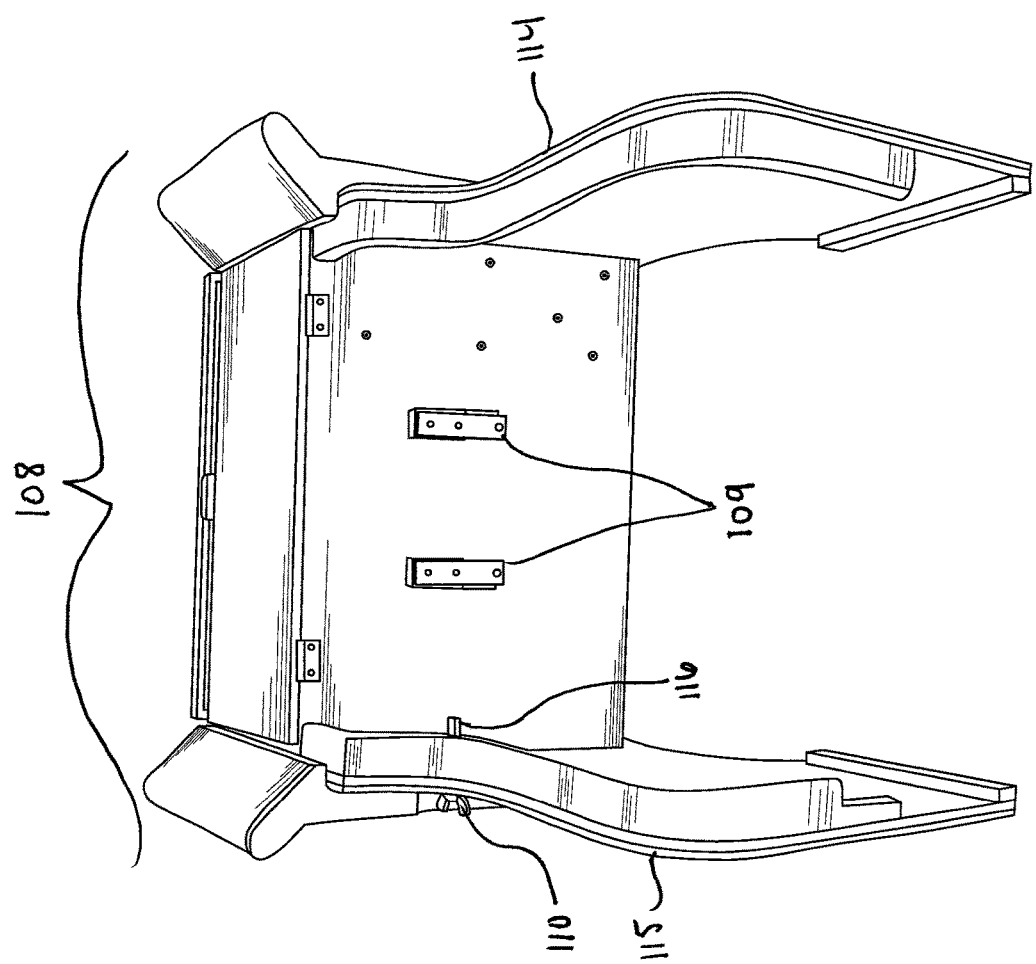
FIG. 3 shows the second member body that abuts the frame of the seat with the two hooks that fit into the bracket and a bolt attachment.

The second member body 108 attaches to the bracket 102 on the extension member 101 via the hooks 109 shown in FIG. 3. The original bolt 116 on the frame of the seat on the right-hand side of the frame 113 of the seat is removed and inserted in the opposite direction as originally manufactured as shown in FIGS. 3 and 5.

Figure 4:
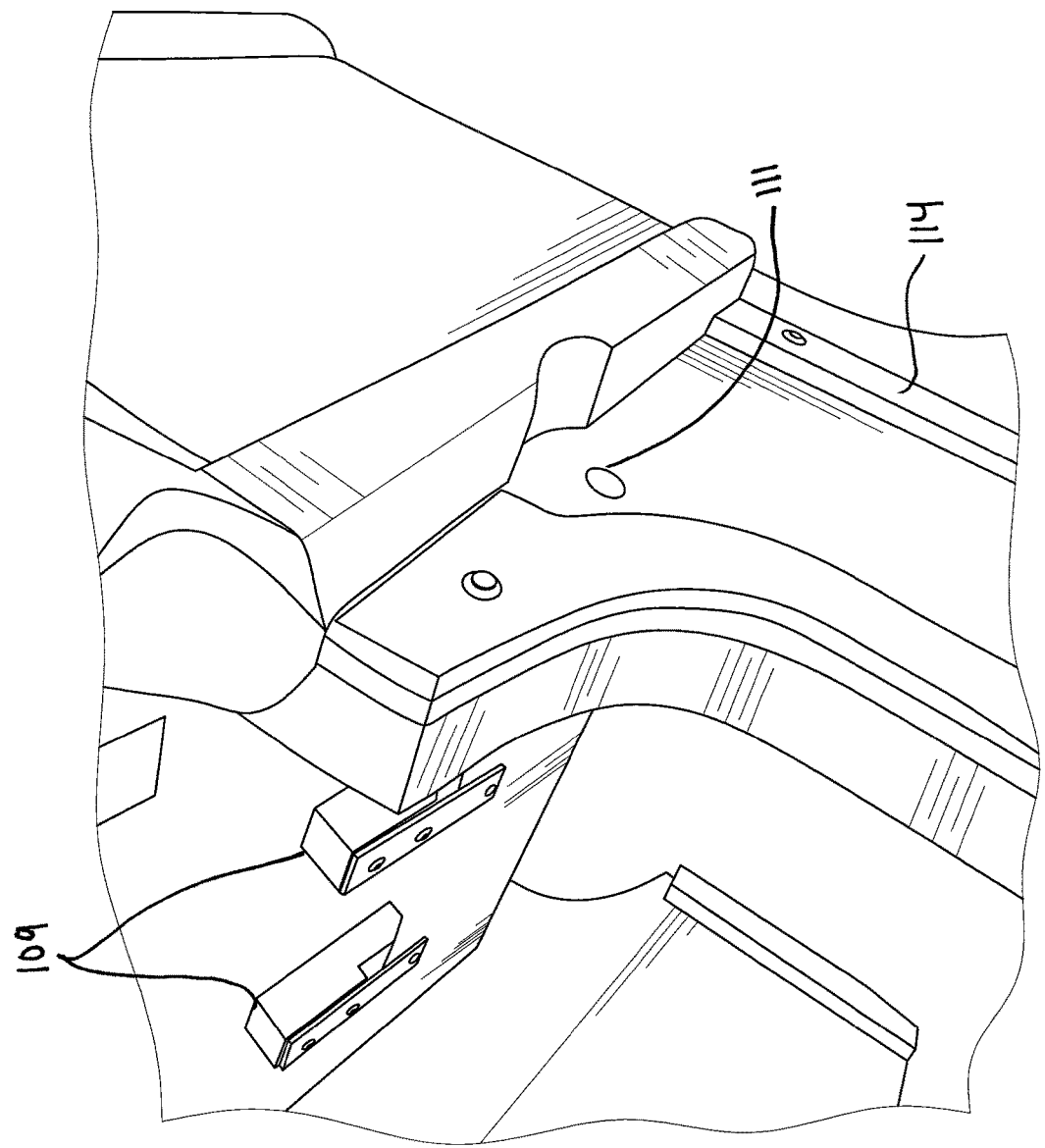
FIG. 4 shows the outside of the first side panel of the second body member with the first hole.

The bolt attachment 110 connects to the reversed bolt 116 in FIGS. 3 and 5 to secure the second side panel 115 to the frame 113. FIG. 4 shows the first hole 111 in the first side panel 114 that attaches over the long bolt 103. The first side panel 114 is secured in place with a nut 117 (FIG. 1). The rear view of the second member body 108 resembles the rear end of a motor vehicle as shown in FIG. 5. The second member body 108 is lifted to allow the hooks 109 to insert into the bracket 102 on the extension member 101 as shown in FIG. 5. The bolt attachment 110 interacts with and connects to the reversed second bolt 116 to secure the second side panel 115 to the frame 113 as shown in FIG. 5. FIG. 5 also shows the first member body 104 secured to the steering column 112 via the latching member 106. Finally, FIG. 5 shows the converted scooter with both the first and second member bodies 104, 108 attached.

While the invention has been illustrated and described in detail in the foregoing drawings and description, the same is to be considered as illustrative and not restrictive in character, it being understood that only illustrative embodiments thereof have been show and described and that all changes and modifications that are within the scope of the following claims are desired to be protected.

All references cited in this specification are incorporated herein by reference to the extent that they supplement, explain, provide a background for or teach methodology or techniques employed herein.

What is claimed is:

1. A method for using a scooter conversion kit comprising:
   providing a standard mobility scooter comprising:
      a steering column;
      a seat;
      a frame comprising;
         a first bolt with a first nut;
         a second bolt with a second nut;
   providing an extension member connectible to the frame;
   providing a bracket attachable to the extension member;
   providing a long bolt connectible to the frame;
   a bolt attachment connectible to the second bolt;
   providing a first body member connectible to the steering column comprising:
      a recession;
      a latching member;
   providing a second body member connectible to the frame comprising:
      a plurality of hook members;
      a first side panel with a first hole;
      a second side panel with a second hole;
   abutting the recession of the first body member to the steering column;
   securing the latching member around the steering column;
   replacing the first bolt of the frame with the long bolt;
   reversing the orientation of the second bolt of the frame;
   attaching the extension member to the frame of the seat;
   attaching the bracket to the extension member;
   inserting the plurality of hook members on the second body member into the bracket;
   situating the first hole on the first side panel over the long bolt;
   situating the second hole on the second side panel to be aligned with the reversed second bolt;
   inserting the bolt attachment through the second hole on the second side panel and over the reversed second bolt; and
   securing the first nut to the long bolt and the second nut to the bolt attachment.

2. A mobility scooter made according to the method of claim 1.

* * * * *